US011788832B2

(12) United States Patent
Caro et al.

(10) Patent No.: US 11,788,832 B2
(45) Date of Patent: Oct. 17, 2023

(54) PHOTOGRAMMETRIC CABLE ROBOT

(71) Applicant: Airbus Operations SAS, Toulouse (FR)

(72) Inventors: Stephane Caro, Nantes (FR); Jean-Christophe Bry, Toulouse (FR); Benjamin Rivalland, Escalquens (FR)

(73) Assignee: Airbus Operations SAS, Toulouse (FR)

( * ) Notice: Subject to any disclaimer, the term of this patent is extended or adjusted under 35 U.S.C. 154(b) by 773 days.

(21) Appl. No.: 16/918,670

(22) Filed: Jul. 1, 2020

(65) Prior Publication Data

US 2021/0003386 A1 Jan. 7, 2021

(30) Foreign Application Priority Data

Jul. 3, 2019 (FR) ...................................... 1907402

(51) Int. Cl.
*G01B 11/00* (2006.01)
*G06T 7/593* (2017.01)
(Continued)

(52) U.S. Cl.
CPC ........... *G01B 11/005* (2013.01); *B25J 9/0078* (2013.01); *G06T 7/593* (2017.01); *G06T 17/05* (2013.01);
(Continued)

(58) Field of Classification Search
CPC ..... G01B 11/005; B25J 9/0078; B25J 9/1664; B25J 9/1615; G06T 7/593; G06T 17/05;
(Continued)

(56) References Cited

U.S. PATENT DOCUMENTS 10,366,531 B2 * 7/2019 Sheffield ................. G06T 15/04
11,481,918 B1 * 10/2022 Ebrahimi Afrouzi ....................... A47L 11/4061
(Continued)

FOREIGN PATENT DOCUMENTS

EP 2982483 A2 2/2016

OTHER PUBLICATIONS

French Search Report; priority document.
(Continued)

*Primary Examiner* — Yaritza Guadalupe-McCall
(74) *Attorney, Agent, or Firm* — Greer, Burns & Crain, Ltd.

(57) ABSTRACT

A method for parameterizing a photogrammetric cable robot, having a frame, a mobile platform carrying a camera and cables, each cable extending from a mobile platform attachment point to a position-adjustable exit point, while remaining linked to the frame. The robot's maximum workspace is defined by the ranges of possible positions of the different cable exit points. A set of pairs of setpoint positions and orientations of the platform is determined, for performing the point measurements of a scene by photogrammetry. Then, a genetic algorithm comprising crossing, transformation and selection operations is applied to a population of vectors, each representing respective positions of cable exit points, the selection being made via a fitness function involving a first objective function evaluating a collision percentage and a second objective function evaluating a percentage violation of a mobile platform constraint of equilibrium, when the platform assumes the different setpoint positions and orientations.

10 Claims, 9 Drawing Sheets

(51) Int. Cl.
B25J 9/00 (2006.01)
G06T 17/05 (2011.01)

(52) U.S. Cl.
CPC ............... *G06T 2207/10012* (2013.01); *G06T 2207/10028* (2013.01)

(58) Field of Classification Search
CPC .......... G06T 2207/10012; G06T 2207/10028; G05B 2219/40273
See application file for complete search history.

(56) References Cited

U.S. PATENT DOCUMENTS

| | | | |
|---|---|---|---|
| 11,501,488 B2* | 11/2022 | Garcia | G06T 15/20 |
| 11,501,492 B1* | 11/2022 | Li | H04N 23/698 |
| 11,597,077 B2* | 3/2023 | Trigui | B25J 9/1664 |
| 2019/0026956 A1* | 1/2019 | Gausebeck | G06T 19/20 |
| 2019/0026957 A1* | 1/2019 | Gausebeck | H04N 13/10 |
| 2019/0035165 A1* | 1/2019 | Gausebeck | G06T 17/00 |
| 2019/0098221 A1* | 3/2019 | Troy | H04N 7/18 |
| 2019/0122425 A1* | 4/2019 | Sheffield | H04N 13/243 |
| 2021/0003386 A1* | 1/2021 | Caro | G01B 11/005 |
| 2021/0125397 A1* | 4/2021 | Moulon | G06T 17/00 |
| 2022/0024031 A1* | 1/2022 | Trigui | B25J 9/0009 |
| 2022/0358764 A1* | 11/2022 | Qian | G06V 20/176 |

OTHER PUBLICATIONS

J.-D. Deschenes et al., "A Cable-driven Parallel Mechanism for Capturing Object Appearance from Multiple Viewpoints," 3-D Digital Imaging and Modeling, 2007, pp. 367374.

A. Ghasem et al., "Generalized Ray-Based Lattice Generation and Graph Representation of Wrench-Closure Workspace for Arbitrary Cable-Driven Robots," IEEE Transactions on Robotics, vol. 35, No. 1, pp. 147-161, 2019.

* cited by examiner

PHOTOGRAMMETRIC CABLE ROBOT

CROSS-REFERENCES TO RELATED APPLICATIONS

This application claims the benefit of the French patent application No. 1907402 filed on Jul. 3, 2019, the entire disclosures of which are incorporated herein by way of reference.

FIELD OF THE INVENTION

The present invention relates to the field of photogrammetry and more particularly to a method for parameterizing a photogrammetric cable robot.

BACKGROUND OF THE INVENTION

Photogrammetry is a well-known technique that makes it possible to render a 3D representation of a scene by using the parallax obtained between images acquired from different viewpoints. This technique is commonly used in industrial metrology.

When the objects to be measured are of large size, use can be made of a photogrammetry robot taking views of the object to be rendered at different points and from different angles. An example of photogrammetry robot with articulated arm is described in the U.S. patent application US-A-2019/0122425.

It has also been proposed to use a particular type of robot, called parallel cable robot, or, more simply, cable robot, to perform photogrammetry measurement campaigns. An example of such a photogrammetry system will be found in the article by J-D Deschênes entitled "A cable-driven parallel mechanism for capturing object appearance from multiple viewpoints" published in Proc. of 6th International Conference on 3D Digital Imaging and Modeling (3DIM 2007), 21-23 Aug. 2007.

It will be recalled that a cable robot is a particular type of robot with parallel kinematic whose kinematic chains are not rigid segments but cables. These cables, attached to a mobile platform, are each linked to an independent winch via one or more return pulleys. The points at which the cables are fixed to the mobile platform are called attachment points. A cable consequently extends from an attachment point on the mobile platform to an anchoring point on the frame (or base), embodied by the winch on which it is wound. The expression exit point of a cable describes the point of contact of the cable on the last return pulley (or last eyelet) before being attached to the mobile platform. The position and the orientation of the mobile platform are thus determined by the lengths of the different cables between the attachment points and the exit points.

In some cases, the exit points can be mobile relative to the frame so as to allow for an adaptive configuration of the robot, as described in the European patent application EP-A-2982483.

A cable robot offers the advantage of being able to move rapidly in translation. However, adapting it to photogrammetry is a complex task. Indeed, it is first of all essential to take account of the constraints inherent to this type of robot, certain parts of the workspace not being accessible to the mobile platform because of collision phenomena (collisions between cables, collisions between cables and the platform, or even collisions between cables and the environment). Then, it is essential to ensure that the camera mounted on the mobile platform is sufficiently stable to allow shots to be taken and that no cable or part of the mobile platform obstructs its field of view. Finally, the successive positions and attitudes of the camera must make it possible to render the 3D representation of the scene and, more generally, perform a campaign of measurements of position of a predetermined set of points of the scene.

One aim of the present invention is to propose a method for parameterizing a photogrammetric cable robot that makes it possible to perform a campaign of measurements of position of a predetermined set of points of a scene without difficulty.

SUMMARY OF THE INVENTION

The present invention is defined by a method of parameterizing a photogrammetric cable robot comprising a frame, a mobile platform on which there is mounted at least one camera and a plurality of cables, each cable extending from an attachment point of the mobile platform to an exit point linked to the frame, the different cables being able to be actuated so as to move and steer the platform, the positions of the exit points of the different cables being adjustable on the frame. This parameterizing method is specific in that:

- a set $S_{ep}$ of vectors representing all the possible positions of the cable exit points is determined, this set defining a maximum workspace of the photogrammetric robot;
- from a predetermined set of points to be measured $S_{env}$ in a scene, and from this set of vectors $S_{ep}$, a set A of pairs of setpoint positions and orientations of the platform is determined to perform the measurements of the points of $S_{env}$ by photogrammetry;
- an initial population of vectors of $S_{env}$ is generated and crossing, transformation and selection operations are applied cyclically to it, to obtain, for each cycle, a new population, the crossing, transformation and selection operations being repeated until a stop criterion is satisfied, this selection operation being performed by means of a fitness function, the fitness function being a combination of objective functions, including at least one first objective function evaluating a collision percentage and one second objective function evaluating the percentage violation of a constraint of equilibrium of the mobile platform, when the latter assumes the different setpoint positions and orientations;
- when the stop criterion is satisfied, the vector of exit points corresponding to the highest value of the fitness function is selected and the positions of the exit points are set according to the values of the components of the duly selected vector.

This collision percentage can be calculated from a collision percentage between any two cables of the plurality of cables and a collision percentage of one cable of the plurality of cables with the platform.

The percentage violation of a constraint of equilibrium of the platform can be calculated as the percentage of pairs of setpoint positions and orientations for which a capacity margin indicator indicates an impossibility of equilibrium of the platform, given the maximum tensions of the cables and their attachment positions on the platform.

Advantageously, the combination of objective functions also involves a third objective function evaluating the percentage of pairs of setpoint positions and orientations for which the tension of at least one of the cables is greater than a predetermined maximum tension value.

The set A of the pairs of setpoint positions and orientations can be determined in such a way that each point to be measured of $S_{env}$ belongs to the field of view of the camera for at least one first pair of setpoint position and orientation of Λ and one second pair of setpoint position and orientation of Λ, distinct from the first, and that the measurement of this point, obtained by photogrammetry from images of the camera when it assumes the position and orientation of the first pair, then the position and orientation of the second pair, is less than a predetermined maximum error value.

Preferably, after each selection operation, for each of the pairs of setpoint positions and orientations, a determination is made as to whether the field of view of the camera is obstructed by a cable, an element of the platform or an element of the frame, and, in case of obstruction, the set Λ is modified by replacing this pair of setpoint position and orientation with a new pair of setpoint position and orientation.

Prior to the modification of the set Λ, a check is advantageously carried out to ensure that, when the platform assumes the setpoint position and orientation of the new pair, the photogrammetry measurement error is less than the predetermined maximum error value.

After modification of the set Λ, the crossing, transformation and selection operations are continued cyclically, the objective functions then being evaluated on the different setpoint positions and orientations of the duly modified set Λ.

In all cases, the mobile platform can be in suspended configuration or in fully constrained configuration.

BRIEF DESCRIPTION OF THE DRAWINGS

Other features and advantages of the invention will become apparent on reading of a preferred embodiment of the invention, described with reference to the attached figures in which.

DETAILED DESCRIPTION OF THE PREFERRED EMBODIMENTS

Hereinafter, a photogrammetric cable robot as described in the introductory part will be considered.

Figure 1:
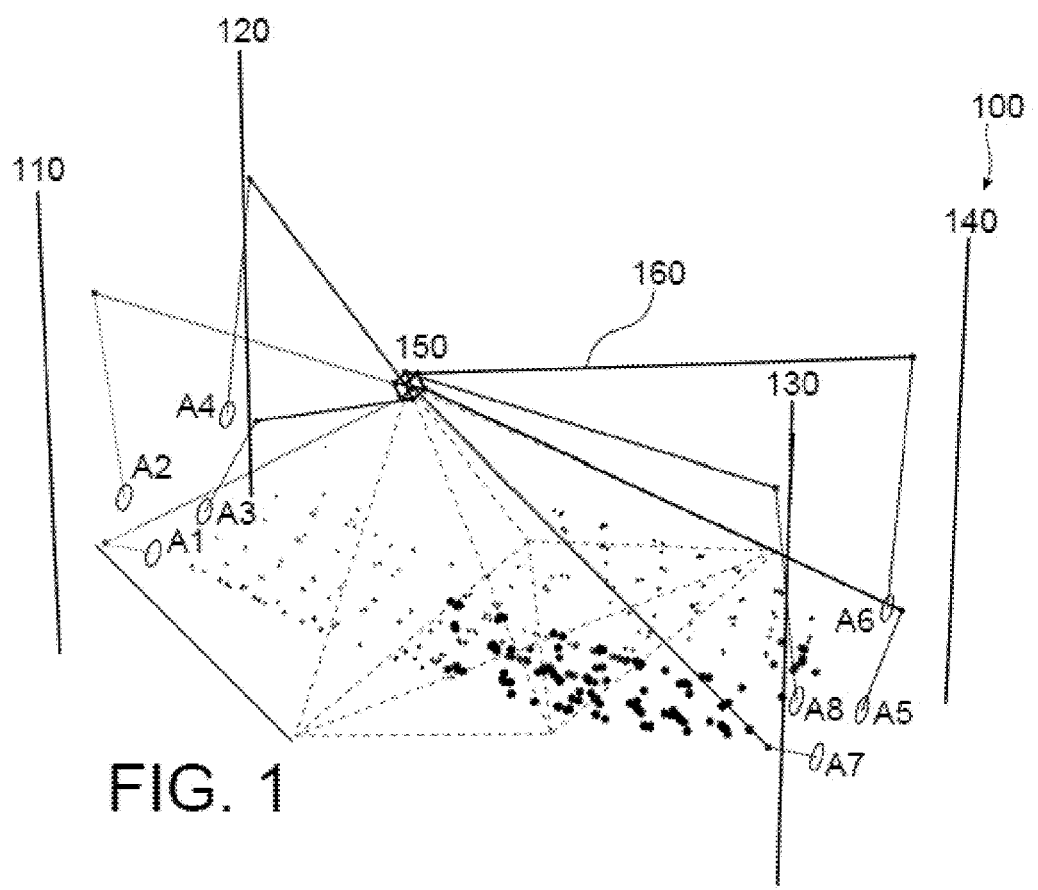
FIG. 1 schematically represents a photogrammetric cable robot.

Such a robot is schematically represented in FIG. 1. It comprises a frame, 100, here comprising four vertical masts, 110, 120, 130, 140, for example, forming part of a metal structure.

The mobile platform (or nacelle), 150, schematically represented here in the form of a cube, is linked to the frame by eight cables, 160, respectively attached to the attachment points of the platform (here the vertices of the cube), a pair of cables being associated with a mast and each cable extending from its attachment point on the platform to an anchor point (generally an actuator such as a winch for example), passing through its exit point (return pulley or eyelet). The anchor points are designated here by A1-A8 and the exit points are designated by EX1-EX8. Advantageously, each return pulley can pivot about the axis of the mast on which it is mounted, so that its groove is always aligned with the cable. The height of each return pulley can be fixed, or else, advantageously, set independently on the frame.

The positions of the exit points of the different cables and the attachment configuration of the platform, the minimum and maximum tensions being able to be exerted by the cables and the torque of the external mechanical loads, define the workspace of the robot.

Figure 2:
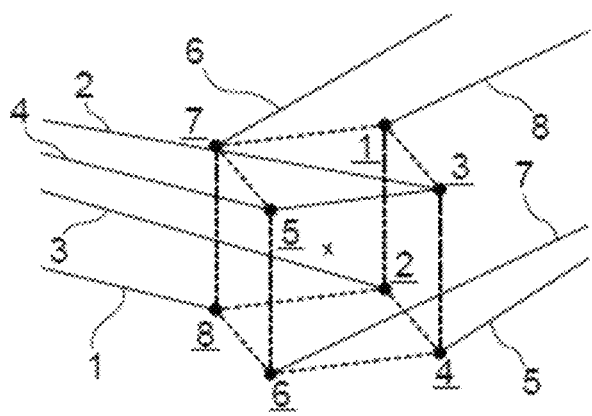
FIG. 2 represents an example of a first type of attachment configuration of the mobile platform.

Different types of attachment configuration of the mobile platform can be envisaged:

In one configuration, called suspended configuration, an example of which is represented in FIG. 2, the cable exit points are situated above the workspace of the robot. The correlation between the attachment points and the numbers of the cables is indicated at the base of the figure. In this configuration, the mobile platform is always suspended by the cables and, in static situation, no downward vertical force, other than that of simple gravity, is exerted on the platform. The weight of the platform therefore here plays an essential role in guaranteeing the mechanical equilibrium of the robot.

Figure 3A:
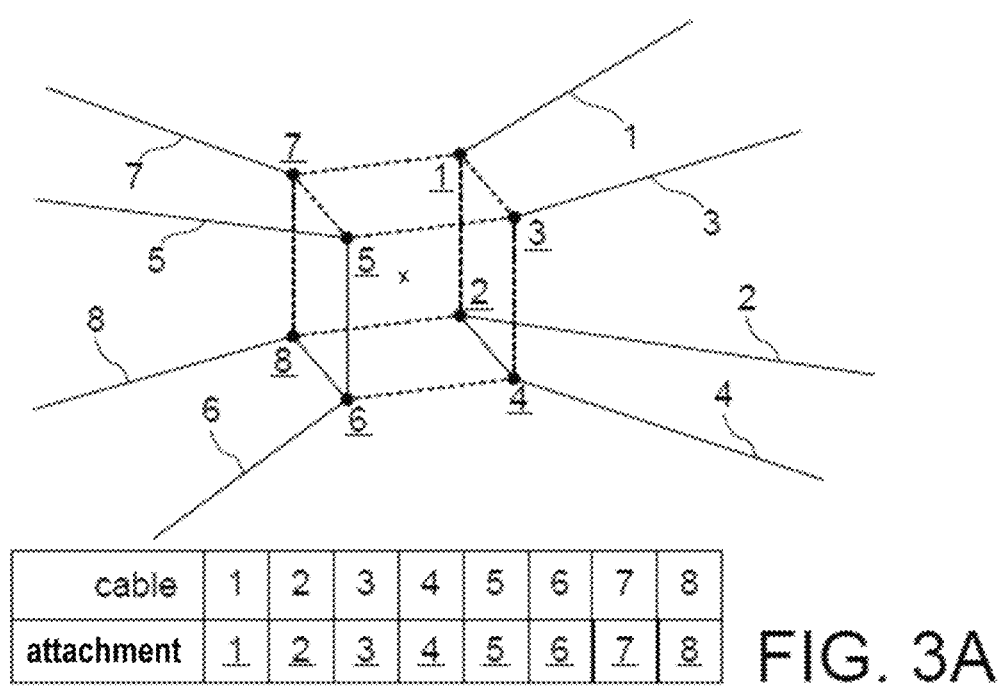
FIGS. 3A, 3B and 3C represent examples of a second type of attachment configuration of the mobile platform.
Figure 3B:
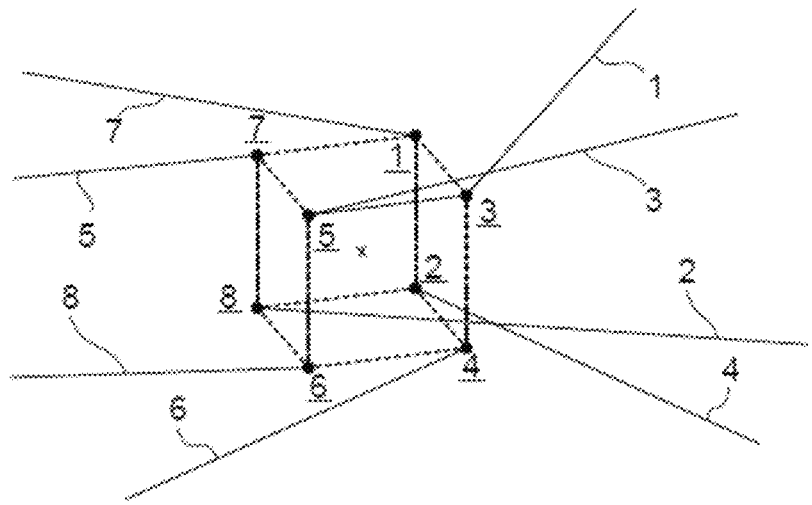
Figure 3C:
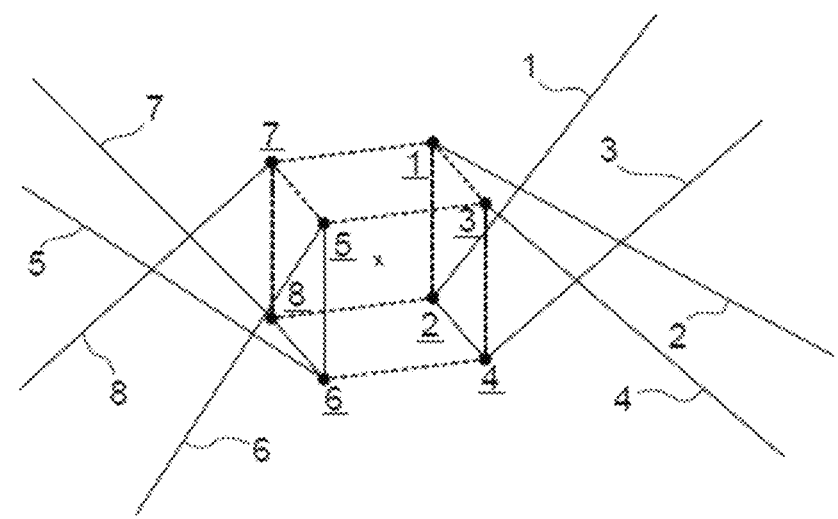

In a fully constrained configuration, various examples of which are represented in FIGS. 3A-3C, the workspace of the robot is included in the polyhedron formed by the exit points of the different cables. In this configuration, the cables work in opposition, on either side of the mobile platform. Thus, for a platform schematically represented by a cube, the exit points of return pulleys mounted on one and the same mast can be linked to opposing or adjacent vertices of the cube and in different possible combinations. Different combinations are possible according to the manner in which the attachment points of the platform are associated with the exit points of the cables, as indicated in the mapping tables at the bottom of FIGS. 3A-3C.

It can be seen that, according to the different possible configurations and combinations, the situations of collision of cables with one another, with the platform or with the environment are different.

The positions of the different cable exit points, combined with the configuration of attachment of the cables on the platform, define a workspace of the photogrammetric robot.

Figure 4:
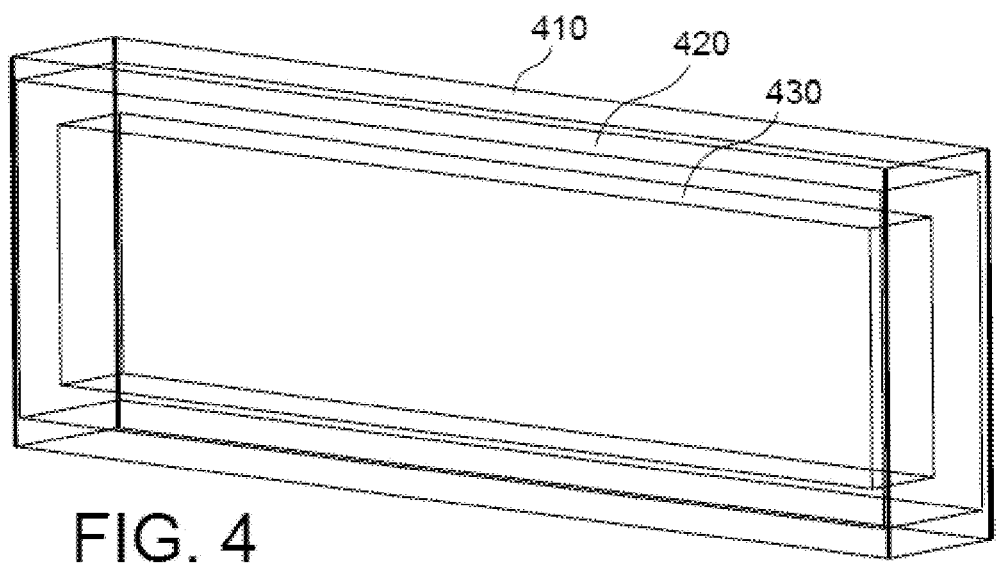
FIG. 4 represents a maximum workspace of the photogrammetric robot, for a given configuration of the cable exit points.

More specifically, in FIG. 4, a workspace of the photogrammetric robot has been schematically represented. This workspace is defined as the envelope of the positions of the geometric (or isobarycentric) center of the mobile platform when the cables are actuated by the winches. In other words, the workspace is that scanned by the geometric center of the mobile platform when the cable lengths between their attachment points and their respective exit points take all the possible values guaranteeing the static and dynamic equilibrium of the robot.

It will be noted that this envelope is contained in a polyhedron (here a parallelepiped) whose vertices are exit points of the different cables. For given positions of the exit points, the offset between the workspace and the polyhedron is due to the respective distances between the geometric center of the platform and the different attachment points of the cables.

It will be noted that the focal point of the camera with which the mobile platform is equipped will be able to be distinct from the geometric center thereof. In some cases, the focal point of the camera will be able to be indexed according to three axes, in other words its position will be able to be controlled according to a reference frame linked to the platform. Likewise, the Euler angles defining the orientation of the camera relative to a trihedron linked to the platform will be able to be controlled to vary the attitude of the camera.

It should be noted that the mobile platform can be equipped with a plurality of cameras, notably to simultaneously take shots in a plurality of directions. In this case, the above comments apply to each of the cameras.

The polyhedron corresponding to the extreme positions of the exit points, that is to say, when these exit points are farthest away from one another, is represented in 420. Hereinbelow, the surface of this polyhedron is called extreme surface of the exit points. The workspace, 410, of the photogrammetric robot corresponding to the extreme positions of the exit points is called maximum workspace.

Given the extreme surface of the exit points and of the maximum workspace that can be deduced therefrom, the parameterizing method according to the present invention sets out to find, for a given set of points to be measured in a scene or on an object, the optimal positions of cable exit points for operating the photogrammetric robot.

Figure 5:
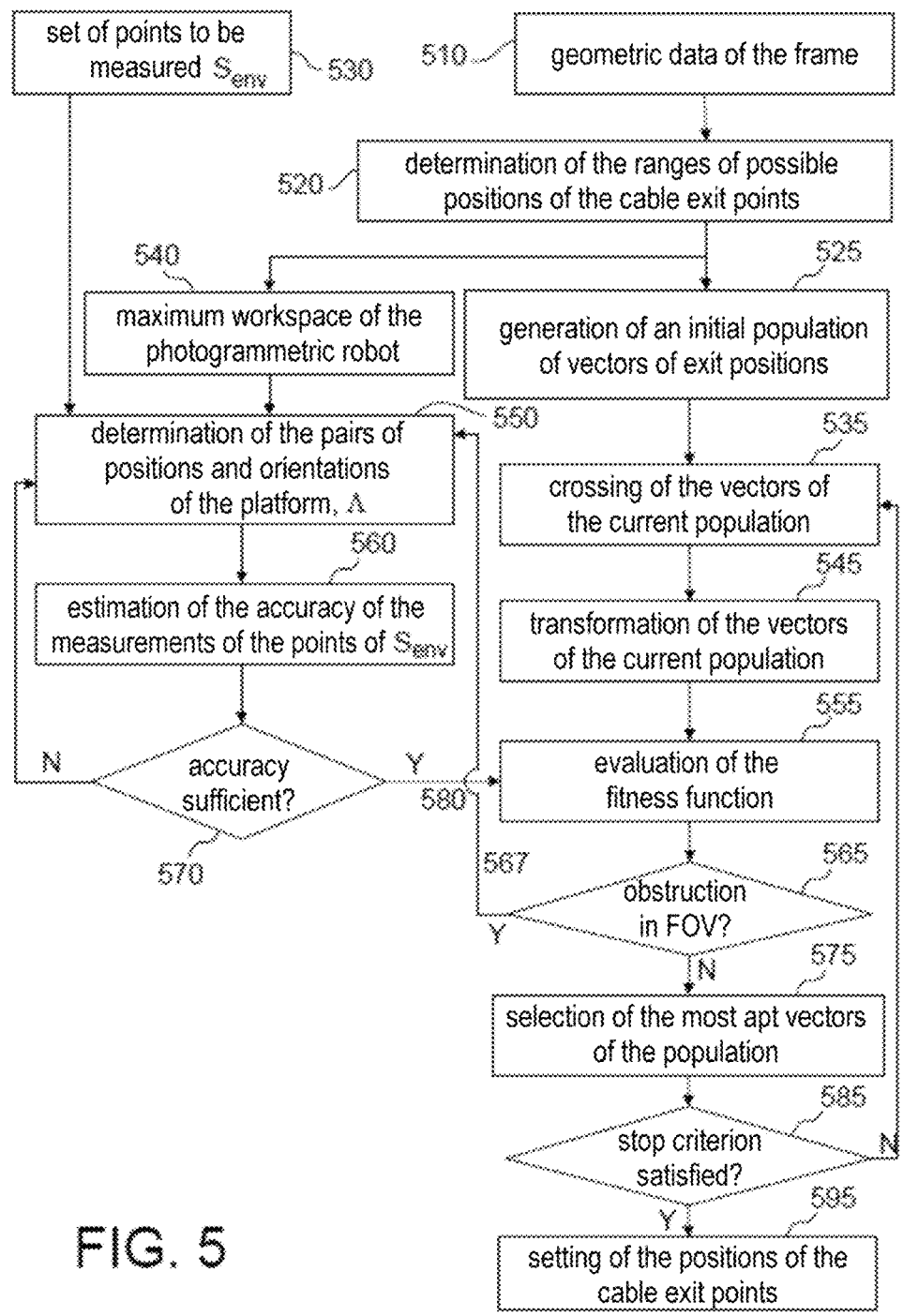
FIG. 5 represents a flow diagram of a method for parameterizing a photogrammetric robot according to an embodiment of the invention.

FIG. 5 schematically represents the flow diagram of a method for parameterizing a photogrammetric robot according to an embodiment of the invention.

The parameterizing method assumes knowledge of a certain number of geometric and physical characteristics of the photogrammetric robot.

It is assumed, in particular, that the geometric and physical characteristics of the platform are known or that they are the subject of a working hypothesis. This working hypothesis can be iterated if necessary.

Geometric characteristics are understood here to be the dimensions of the mobile platform, the attachment configuration of the platform and its type (suspended or fully constrained configuration), the positions of the attachment points on the platform and, if appropriate, the position and the orientation of the camera on the platform.

Physical characteristics of the platform are understood to be the weight of the platform, including that of its payload (that is to say, the camera or cameras) and the moment of the external forces which are exerted on them.

There are also geometric characteristics (diameter for example) and physical characteristics of the cables, in particular their specific weight and the maximum tensions that they can support.

In all cases, the positions of the cable exit points form part of the parameters to be determined.

The geometric data of the frame is represented in 510. From the geometric data of the frame, it is possible to deduce, in 520, the ranges of the possible positions of the different exit points, defining the extreme surface of the exit points. Thus, for example, in the case illustrated in FIG. 4, the possible positions are situated on the vertical edges of the parallelepiped 420. Other frame geometries can of course be envisaged without departing from the scope of the present invention. In particular, the ranges of possible positions of the exit points are not necessarily on vertical edges.

The term vector of the exit points of the cables will be used hereinbelow to designate any N-uplet ($ep_1, \ldots, ep_N$) in which $ep_n$ represents the coordinates of the exit point of index n. Without sacrificing generality, it will be assumed that the exit points are situated on vertical edges and that their ranges of possible positions are identical. In other words, the vector of the exit points can be expressed in the form ($z_1, \ldots, z_N$) in which $z_{min} \leq z_n \leq z_{max}$ n=1, ..., N in the reference frame Oxyz linked to the frame, the axis Oz being the vertical axis and $[z_{min}, z_{max}]$ being the common range of possible values of z.

From the ranges of the exit points of the cables, it is possible to deduce, in 540, the maximum workspace of the photogrammetric robot, that is to say, as indicated above, the envelope of the possible positions of the geometric center of the mobile platform, for one or more given orientations of the platform.

In 530, the parameterizing method also receives as input a set, $S_{env}$, of the points to be measured of a scene (or more particularly of an object). These points are defined by their coordinates in the reference frame Oxyz, with, if appropriate, a tolerance margin on these coordinates. It should be noted that it is here indeed an at least approximate knowledge of the positions of the points to be measured that makes it possible, as indicated below, to determine the setpoint positions and orientations of the camera (or, if appropriate, of the cameras). From the maximum workspace of the photogrammetric robot, from the set $S_{env}$, and from the characteristics of the camera, a photogrammetric simulation module determines, in 550, a set of setpoint positions of the camera and, for each of these setpoint positions, the setpoint orientation or orientations that the camera must adopt to be able to measure by triangulation the points of the set $S_{env}$. Such a simulation module is available in the form of a software product marketed under the name of V-STARS™ by the company Geodetic Systems.

The photogrammetric simulation module checks, in particular, that each point to be measured (given the tolerance margin) is indeed covered by a predetermined number of shots with an angular deviation that is sufficient to be able to perform the triangulation with the required minimum degree of accuracy.

In other words, as long as the degree-of-accuracy constraint is not borne out in 570, the set of the pairs of positions and orientations is corrected in 550.

Figure 6:
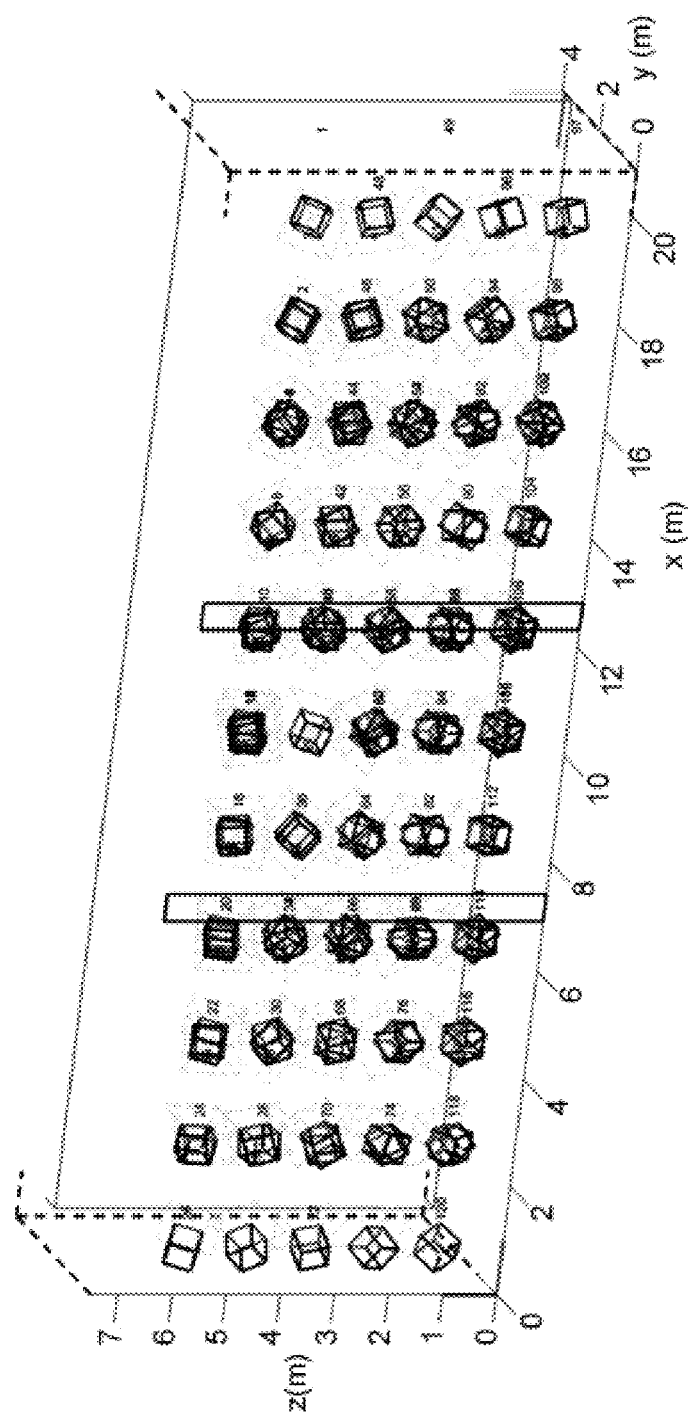
FIG. 6 represents all of the positions and orientations of a camera embedded on the platform to perform a campaign of measurements of a scene.

FIG. 6 represents an example of a set of setpoint positions and orientations for a photogrammetric robot. It can be seen that, for each setpoint position, the platform must assume a plurality of setpoint orientations to take a shot of the scene to be measured.

The set of the setpoint positions and orientations of the camera is supplied in 580 to the genetic algorithm, in the form of a file, Λ.

The genetic algorithm represented on the right of the figure has, on the one hand, ranges of possible positions of each of the cable exit points and, on the other hand, geometric and physical characteristics of the platform and of the cables as defined above.

From the ranges of possible positions of the exit points, in the step 525, a population of vectors of the exit points is generated. This population of vectors can be obtained by random draw from the range $[z_{min}, z_{max}]$, a vector of this population having for its components the results of N random draws from this range. Each vector of the population can be considered as a potential solution of the photogrammetric robot parameterizing problem.

Once the population of vectors has been constituted, this population is subjected to successive crossing, transformation and selection operations as explained hereinbelow.

In 535, the operation of crossing between two parent vectors of the population will be able to comprise forming a vector of which a first half is composed of the N/2 first components of one of the parent vectors and a second half of the N/2 last components of the other parent vector. Other breakpoint positions can, of course, also be envisaged.

In 545, the transformation operation will be able to be performed by adding a Gaussian noise vector. For example, if ep is used to denote a vector of exit points at the output of the crossing operation, the transformed vector will be given by:

$$ep' = ep + \sigma \cdot N(0,1) \quad (1)$$

in which $N(0,1)$ is a vector whose components are random variables i.i.d that obey a centered normal law, and in which $\sigma$ is the transformation rate, giving the magnitude of the Gaussian noise.

The exit point vectors that have a component outside of the range $[z_{min}, z_{max}]$ are directly eliminated.

In the step 555, the value of the fitness function is evaluated for each vector ep of the current population (after the crossing and transformation operations), on the basis of the set of the setpoint positions and orientations of the camera.

This fitness function takes account of one or more objective functions, in which:

A first objective function, $F_1$, represents the percentage violation of a constraint of equilibrium of the platform, when the latter assumes the different setpoint positions and orientations. This equilibrium constraint is advantageously calculated as the capacity margin index or CMI. A detailed description of the calculation of this index will be found in the article by F. Guay entitled "Measuring how well a structure supports varying external wrenches", 2nd Conf. on Mechanisms, Transmissions and Applications, Bilbao, Spain, 2013. This index represents the minimum degree of satisfaction of the static equilibrium constraints of the platform, given the torque of the forces external to the structure (essentially due to gravity) and the torque due to the application of the tensions of the cables to the attachment points. It assumes knowledge of the positions of the attachment points on the platform and the maximum tensions of the cables.

The calculation of this index is performed for each setpoint position and orientation pair of the platform. When this index is positive, there are cable tension values that are positive and lower than the abovementioned maximum values that make it possible to guarantee a position of equilibrium of the platform (equipped with its payload). On the other hand, when this index is negative, there is no N-uplet of cable tensions that are positive and lower than the abovementioned maximum values that make it possible to guarantee the static equilibrium of the platform.

A second objective function, $F_2$, represents the collision percentage between at least two cables when the mobile platform assumes the different setpoint positions and orientations.

A third objective function, $F_3$, represents the collision percentage between at least one cable and the mobile platform when the mobile platform assumes the different setpoint positions and orientations.

A fourth objective function, $F_4$, represents the collision percentage between the mobile platform and the environment of the frame when the latter assumes the different setpoint positions and orientations.

Other objective functions can, if necessary, be taken into account. Thus, for example, it will be possible to apply a fifth objective function representing the percentage violation of the maximum cable tension when the platform assumes the different setpoint positions and orientations.

These objective functions generally represent a frequency of collision or a violation of a constraint when the mobile platform assumes the different setpoint positions and orientations.

The fitness function, F, combines these K different objective functions, for example in the form of a linear combination with weighting coefficients. Thus, for example, it will be possible to choose as fitness function:

$$F(ep) = \sum_{i=1}^{K} w_i (1 - F_i(ep)) \quad (2)$$

in which $w_i$, $i=1, \ldots, K$, are the different weighting coefficients.

Figure 7A:
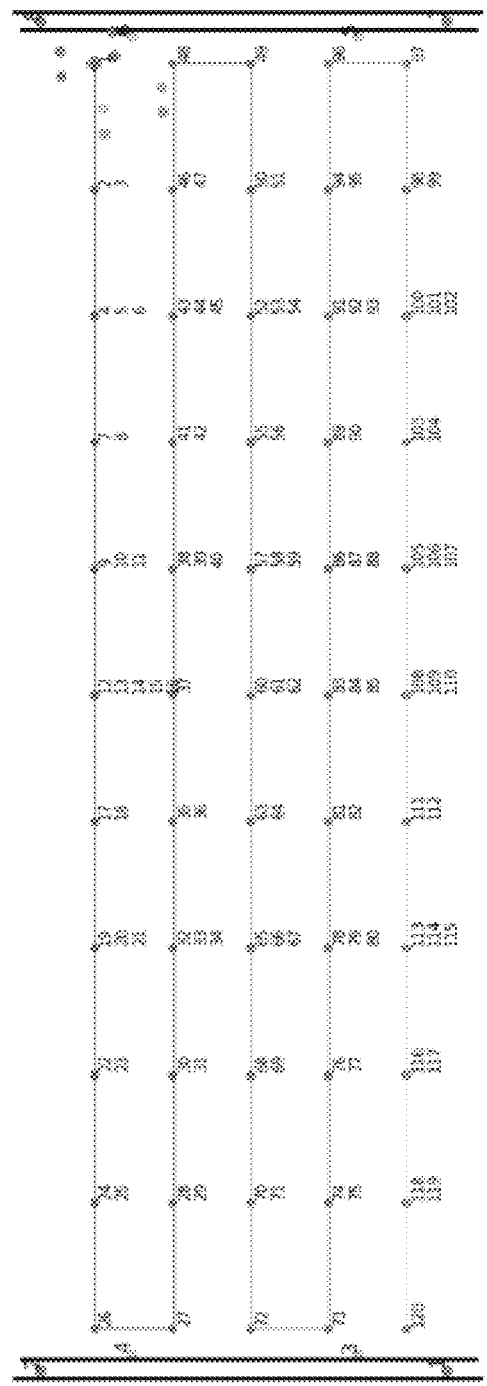
FIGS. 7A and 7B represent a first trajectory and a second trajectory for performing a campaign of photogrammetric measurements.
Figure 7B:
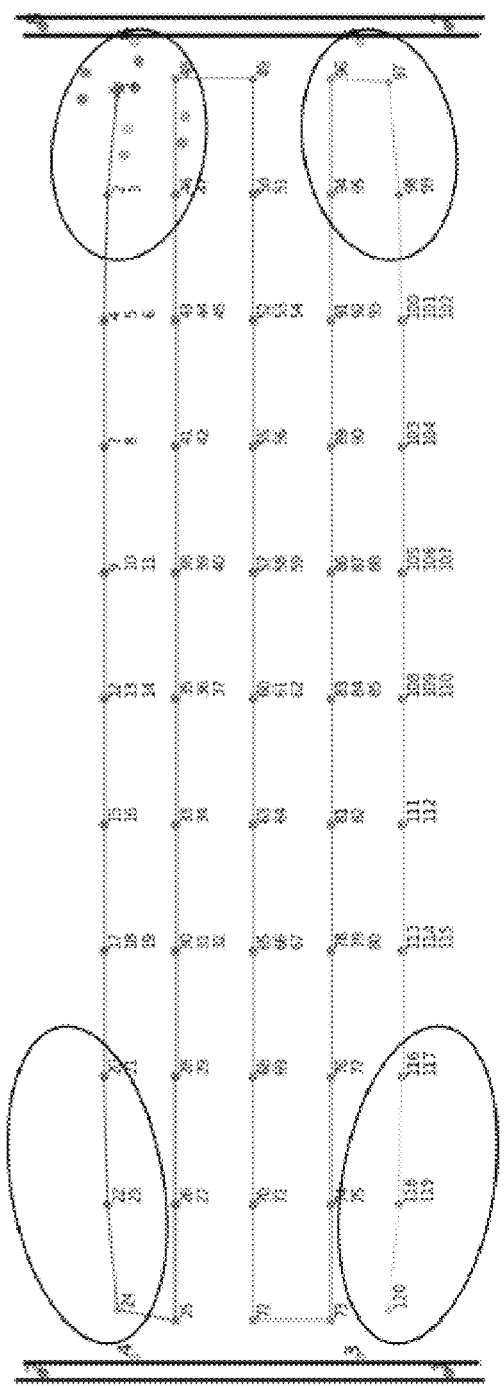

In the step 565, a determination is made, for each vector, ep, of the population, as to whether there is an obstruction of the field of view of the camera when the platform assumes the different setpoint positions and orientations. This obstruction can be due to the mobile platform or to the cables, for example. When such an obstruction is observed for a point and a setpoint orientation, the combination of this point and of this orientation is eliminated from the set of the pairs of setpoint position and orientation of the platform. This pair can then be replaced by another pair corresponding to a setpoint position different from that eliminated and of setpoint orientation that makes it possible to cover the same field of view on the object. This situation is represented in FIG. 7B in which the encircled zones indicate the setpoint positions (and, if necessary, the setpoint orientations) which have been modified in FIG. 7A. If necessary, when the camera is angularly indexed, the setpoint orientation of the platform will be able to be identical, only the orientation of the camera being modified.

The elimination or the replacement of one or more pairs of setpoint position and orientation in the file A is indicated by the feedback 567. If necessary, the position tolerances of the points to be measured can be verified by calling the routine 560. If these tolerances are not observed, the step 550 is repeated.

In the absence of obstruction of the field of view of the camera when the platform assumes the different setpoint positions and orientations of $\Lambda$, there is a switch to the selection step.

In the step 575, the vectors of the population that achieve the highest values of the fitness function are selected. These vectors constitute a new population of vectors, defining the population of the next generation.

Finally, in 585, a test is carried out to see if a stop criterion is satisfied, for example if a predetermined number of iterations has been reached.

In the affirmative, the vector of cable exit points, $ep^{opt}$, corresponding to the highest value of the fitness function, is selected in 595. The components of this vector $z_1^{opt}, \ldots, z_N^{opt}$ provide the respective setting heights of the different cable exit points along the masts of the frame.

On the other hand, in the negative, there is a return to 535 to restart a new crossing-transformation-selection cycle.

According to a variant, the optimization by the genetic algorithm can be completed by a phase of optimization by the gradient algorithm. In this case, the genetic algorithm provides a solution that approaches the optimum. That optimum is then sought by successive iterations by calculating the gradient of the cost function on each iteration and by updating the positions of the exit points by following the direction opposite this gradient, as is known per se.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for parameterizing a photogrammetric cable robot comprising:
   a frame,
   a mobile platform on which there is mounted at least one camera, and
   a plurality of different cables, each cable extending from an attachment point of the mobile platform to an exit point linked to the frame, the different cables being able to be actuated so as to move and steer the platform, positions of the exit points of the different cables being adjustable on the frame,
   wherein a set $S_{ep}$ of vectors representing all possible positions of the cable exit points is determined, this set defining a maximum workspace of the photogrammetric robot;
   wherein from a predetermined set of points to be measured $S_{env}$ in a scene, and from the set of vectors $S_{ep}$, a set $\Lambda$ of pairs of different setpoint positions and orientations of the platform is determined to perform measurements of the points of $S_{env}$ by photogrammetry;
   wherein an initial population of vectors of $S_{env}$ is generated and crossing, transformation and selection operations are applied cyclically to it, to obtain, on each cycle, a new population, the crossing, transformation and selection operations being repeated until a stop criterion is satisfied, this selection operation being performed by means of a fitness function, the fitness function being a combination of objective functions, including at least one first objective function evaluating a collision percentage and one second objective function evaluating a percentage violation of a constraint of equilibrium of the mobile platform, when the mobile platform assumes said different setpoint positions and orientations;
   wherein when the stop criterion is satisfied, the vector of exit points corresponding to a highest value of the fitness function is selected and the positions of the exit points are set according to values of components of the selected vector.

2. The method for parameterizing a photogrammetric cable robot according to claim 1, wherein said collision percentage is calculated from a collision percentage between any two cables of said plurality of cables and the collision percentage of one cable of said plurality of cables with the platform.

3. The method for parameterizing a photogrammetric cable robot according to claim 1, wherein said percentage violation of a constraint of equilibrium of the platform is calculated as a percentage of pairs of setpoint positions and orientations for which a capacity margin indicator indicates an impossibility of equilibrium of the platform, given a maximum tensions of the cables and their attachment positions on the platform.

4. The method for parameterizing a photogrammetric cable robot according to claim 1, wherein the combination of objective functions also involves a third objective function evaluating the percentage of pairs of setpoint positions and orientations for which the tension of at least one of the cables is greater than a predetermined maximum tension value.

5. The method for parameterizing a photogrammetric cable robot according to claim 1, wherein the set $\Lambda$ of the pairs of setpoint positions and orientations is determined in such a way that each point to be measured of $S_{env}$ belongs to a field of view of the camera for at least one first pair of setpoint position and orientation of $\Lambda$ and one second pair of setpoint position and orientation of $\Lambda$, distinct from the first, and wherein the measurement of said point, obtained by photogrammetry from images of the camera when the camera assumes the position and orientation of the first pair, then the position and orientation of the second pair, is less than a predetermined maximum error value.

6. The method for parametrizing a photogrammetric cable robot according to claim 1, wherein, after each selection operation, for each of the pairs of setpoint positions and orientations, a determination is made as to whether a field of view of the camera is obstructed by a cable, an element of the platform or an element of the frame, and, in case of obstruction, the set $\Lambda$ is modified by replacing this pair of setpoint position and orientation with a new pair of setpoint position and orientation.

7. The method for parameterizing a photogrammetric cable robot according to claim 6, wherein, prior to a modification of the set $\Lambda$, there is a check that when the platform assumes the setpoint position and orientation of a new pair, a photogrammetry measurement error is less than said predetermined maximum error value.

8. The method for parameterizing a photogrammetric cable robot according to claim 6, wherein, after modification of the set $\Lambda$, the crossing, transformation and selection operations are continued cyclically, objective functions then being evaluated on different setpoint positions and orientations of the duly modified set $\Lambda$.

9. The method for parameterizing a photogrammetric cable robot according to claim 1, wherein the mobile platform is in suspended configuration.

10. The method for parameterizing a photogrammetric cable robot according to claim 1, wherein the mobile platform is in fully constrained configuration.

* * * * *